_United States Patent Office_

3,496,166
Patented Feb. 17, 1970

3,496,166
3-SUBSTITUTED 1-ARYL-3-BENZAZEPINES
Robert Paul Mull, Florham Park, and George de Stevens, Summit, N.J., assignors to Ciba Corporation, a corporation of Delaware
No Drawing. Continuation-in-part of application Ser. No. 530,321, Feb. 28, 1966. This application Dec. 22, 1967, Ser. No. 692,660
Int. Cl. C07d 41/08
U.S. Cl. 260—239            7 Claims

ABSTRACT OF THE DISCLOSURE 3-basically substituted 1-aryl-1,2-dihydro- or 1,2,4,5-tetrahydro-3-benzazepines, e.g. those of the formula

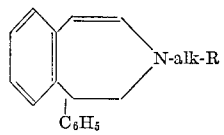

alk=alkylene; R=amino, guanidino, guanyl or hydroxyguanyl; N-oxides, quaternaries and salts thereof are hypotensives.

CROSS-REFERENCES TO RELATED APPLICATIONS

This is a continuation-in-part of application Ser. No. 530,321, filed Feb. 28, 1966, and now abandoned.

SUMMARY OF THE INVENTION

The present invention concerns and has for its object the provision of new 3-basically substituted 1-aryl-1,2-dihydro- or 1,2,4,5-tetrahydro-3-benzazepines, more particularly those of the Formula I

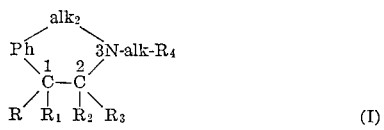

in which Ph is a 1,2-phenylene radical, R is an aryl radical, each of $R_1$, $R_2$ and $R_3$ is hydrogen or lower alkyl, $R_4$ is an amino, guanidino, guanyl or hydroxy-guanyl group and each of $alk_1$ and $alk_2$ is lower alkylene or alkenylene, the former separating two nitrogen atoms by at least two carbon atoms and the latter separating Ph from the 3-nitrogen atom by two ring-carbon atoms, the N-oxides, quarternaries and salts thereof, as well as of corresponding pharmaceutical compositions and of methods for the preparation of these products. Said compositions are preferably useful as hypotensives in the treatment of essential hypertension or of vasospastic conditions.

DESCRIPTION OF THE PREFERRED EMBODIMENTS

The 1,2-phenylene radical Ph is unsubstituted or substituted by one or more than one of the same or different substituents attached to any of the positions available for substitution. Such substituents are, for example, lower alkyl, such as methyl, ethyl, n- or i-propyl, n-, i- or secondary-butyl, etherified or esterified hydroxy or mercapto, for example, lower alkoxy, alkylenedioxy or alkyl-mercapto, such as methoxy, ethoxy, n- or i-propoxy or n-butoxy, methylenedioxy, 1,1- or 1,2-ethylenedioxy, methyl- or ethylmercapto, or halogen, such as fluoro, chloro or bromo, trifluoromethyl, nitro or amino, such as di-lower alkylamino, e.g. dimethylamino or diethylamino. The term "lower," referred to above and hereinafter in connection with organic radicals or compounds respectively, defines such with up to 7, preferably up to 4, carbon atoms.

The aryl radical R is, for example, carbocyclic or heterocyclic, mono- or bicyclic aryl, such as phenyl, naphthyl, thienyl, furyl, pyridyl, quinolyl or isoquinolyl. It preferably stands for unsubstituted or substituted phenyl. These radicals may contain one or more than one of the same or different substituents, such as those mentioned for the phenylene radical Ph.

A lower alkyl radical $R_1$, $R_2$ and/or $R_3$, is for example, one of those mentioned above; it preferably stands for methyl.

The groups $R_4$ are unsubstituted or substituted, preferably by lower alkyl groups, such as those mentioned above, but also by lower alkylene, mon-aza-oxa or thia-alkylene groups, such as 1,2-ethylene, 1,4-butylene, 1,4- or 1,5-pentylene, 1,5- or 2,5-hexylene or 2,6-heptylene, 3-aza-1,5-pentylene, 3 - methyl or -ethyl-3-aza-1,5-pentylene, 3-aza-1,6-hexylene, 3-methyl-3-aza-1,6-hexylene, 4-methyl-4-aza-2,6-heptylene, 3-oxa- or -thia-1,5-pentylene or 4-oxa-2,6-heptylene. Preferred amino groups $R_4$ are di-lower alkylamino, lower alkyleneimino, N-lower alkyl-piperazino, morpholino and thiamorpholino. A guanidino, guanyl and hydroxy-guanyl group $R_4$ is preferably unsubstituted or substituted by lower alkyl or alkylene, such as N,N'-1,2-ethyleneguanyl, i.e. 2-imidazolinyl.

The lower alkylene or alkenylene groups $alk_1$ and $alk_2$ stand preferably for 1,2-ethylene, but also for 1,2-propylene, 1,2- or 2,3-butylene, 1,2- or 2,3-pentylene, 1,2-, 2,3- or 3,4-hexylene or 3,4-heptylene; 1,2-prop-1-enylene, 2,3-but-2-enylene, 2,3-pent-2-enylene or 3,4-hex-3-enylene and $alk_1$ also for methylene, 1,3-propylene, 1,3- or 1,4-butylene, 1,3-, 2,4- or 1,5-pentylene, 2,5-hexylene or 3,5-heptylene; 1,4-but-2-enylene, 2-methyl-1,4-but-2-enylene or 1,5-pent-2-enylene.

The compounds of the invention exhibit valuable pharmacological properties. Apart from a central nervous system depressing activity, they show primarily hypotensive effects, as can be demonstrated in animal tests using, for example, mammals, such as mice or dogs, as test objects. Besides their above-mentioned utility, the compounds of the invention can also be used as intermediates in the preparation of other useful products, preferably of pharmacologically active compounds.

Particularly useful are compounds of the Formula I, in which Ph and R are unsubstituted 1,2-phenylene or phenyl respectively or these radicals substituted by up to 2 members selected from the group consisting of lower alkyl, lower alkoxy, lower alkylenedioxy, halogeno and trifluoromethyl, each of $R_1$, $R_2$ and $R_3$ is hydrogen, $R_4$ is amino, mono- or di-lower alkylamino, lower alkyleneimino, piperazino, N-lower alkyl-piperazino, morpholino, thiamorpholino, guanidino, lower alkyl-guanidino, guanyl, lower alkylguanyl, N,N'-lower alkylene-guanyl, hydroxyguanyl or N- or O-lower alkyl-hydroxy-guanyl, $alk_1$ for lower alkylene separating two nitrogen atoms by at least two carbon atoms and $alk_2$ is 1,2-ethylene, and acid addition salts thereof.

Compounds that are especially valuable are those of the Formula II

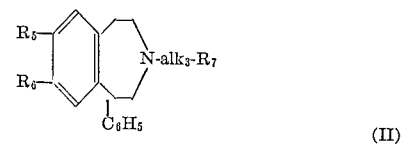

in which $R_5$ is hydrogen or methoxy, $R_6$ is hydrogen, methoxy or chloro, $alk_3$ is alkylene with up to two carbon atoms separating two nitrogen atoms by at least two carbon atoms and $R_7$ is amino, dimethylamino, diethylamino, guanidino, guanyl, hydroxyguanyl or N,N'-1,2- ethyleneguanyl and their therapeutically acceptable acid addition salts, which, when given into the lumen of the small intestine of anesthetized dogs at doses between about 5 and 25 mg./kg./day show an outstanding hypotensive effect.

The compounds of the invention are prepared by methods in themselves known, for example, the process consists in (a) converting in a 3-basically substituted 1-aryl-1,2-dihydro- or 1,2,4,5-tetrahydro-3-benzazepine containing at least one cyano or carbamyl grouping, said grouping to the methyleneimino or -amino grouping or a guanyl or hydroxyguanyl group respectively or (b) reacting a 3-unsubstituted 1-aryl-1,2-dihydro- or 1,2,4,5-tetrahydro-3-benzazepine with a reactive ester of a basically substituted aliphatic alcohol or (c) condensing a reactive ester of a 3-(hydroxyalkyl or a-alkenyl)-1-aryl-1,2-dihydro- or 1,2,4,5-tetrahydro - 3 - benzazepine with an amino compound and, if desired, converting a resulting compound into another compound of the invention.

The conversion of a carbamyl grouping, present in the ring and/or the aliphatic 3-substituent according to item (a) is carried out by reduction, for example, with the use of complex light metal hydrides, such as lithium aluminum hydride, or with hydrogen, e.g. under electrolytic conditions. A cyano group present in the aliphatic 3-substituent may either be reduced, for example, with the use of catalytically activated or nascent hydrogen, such as hydrogen in the presence of platinum, palladium or nickel catalysts, or hydrogen generated by electrolysis, or complex light metal hydrides, such as lithium aluminum hydride, or converted into a guanyl or hydroxyguanyl group by addition of ammonia or amines or hydroxylamines respectively.

A reactive ester mentioned under items (b) and (c) is, for example, that of a hydrohalic or sulfonic acid, such as hydrochloric, hydrobromic, methane-, ethane, benzene- or p-toluenesulfonic acid. Said esters are advantageously reacted in the presence of basic condensing agents, such as alkali or alkaline earth metal carbonates or bicarbonates or tertiary nitrogen bases, such as triethylamine, N,N-dimethyl-aniline or pyridine.

The compounds of the invention so obtained may be converted into each other by methods in themselves known. Thus, for example, a compound unsaturated in the 4,5-positions and/or the aliphatic moiety may be hydrogenated with catalytically activated or nascent hydrogen. Compounds containing in the aliphatic 3-substituent a primary or secondary amino group, may be converted into the corresponding guanidines, for example, by reaction with a corresponding cyanamide, dicyanamide, S-lower alkyl-isothiourea or N-guanyl-pyrazole, -imidazole, -triazole or -tetrazole Primary, secondary or tertiary amino compounds may be converted into tertiary amines or quaternaries respectively, for example, with the use of reactive esters of corresponding alcohols, or glycols, derived, for example, from hydrohalic or sulfonic acids, e.g. those mentioned above. The N-oxides of the invention are obtained, for example, by reacting the free bases with hydrogen peroxide or a peracid, e.g. peracetic, perbenzoic or monoperphthalic acid. The quaternaries are preferably those obtained from an ester of a lower alkanol with a hydrohalic acid.

The above mentioned reactions are carried out according to standard methods, in the presence or absence of diluents, preferably such as are inert to the reagents and are solvents thereof, of catalysts, condensing agents and/or inert atmospheres, at atmospheric or superatmospheric pressure, at low temperatures, room temperature or elevated temperatures.

The compounds of the invention are obtained in the free form or in the form of their salts, depending on the conditions under which the process is carried out; the salts are also included in the present invention. Salts that are obtained can be converted into the free bases in known manner, for example, with alkalis or ion exchangers. Free bases that are obtained can be converted into salts by reaction with organic or inorganic acids, especially those that are suitable for the formation of therapeutically useful salts. Such acids are, for example, hydrohalic acids, e.g. hydrochloric or hydrobromic acid, sulfuric, phosphoric, nitric or perchloric acid, aliphatic, alicyclic, araliphatic, aromatic or heterocyclic carboxylic or sulfonic acids, for example, formic, acetic, propionic, succinic, glycollic, lactic, malic, tartaric, citric, ascorbic, maleic, hydroxymaleic, pyroracemic, phenylacetic, benzoic, aminobenzoic, anthranilic, hydroxybenzoic, salicylic, aminosalicylic, embonic, nicotinic, methanesulfonic, ethanesulfonic, hydroxyethanesulfonic, ethylenesulfonic, halogenbenzensulfonic, toluenesulfonic, naphthalenesulfonic and sulfanilic acid; methionine, trytophan, lysine and arginine.

These or other salts of the new compounds, for example, the picrates, can be used also for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components may be used in the form of their salts. Mainly, those starting materials should be used in the reactions of the invention that lead to the formation of those compounds indicated above as being specially valuable.

The starting materials are known, or if they are new, may be prepared by methods in themselves known. Those mentioned under items (a) and (c) may be prepared as shown in Compt. Rend., 255, 1619 (1962), those mentioned under item (b) according to Ann. Chim., 10, 213 (1965) and Ann. Chim., 8, 255 (1963).

Starting materials or final products that are mixtures of isomers may be separated into single isomers by methods in themselves known. For example, compounds that contain one or more asymmetrical carbon atoms may be in the form of racemate mixtures, pure racemates or optical antipodes. Mixtures of racemates, by virtue of the physicochemical differences between the components, can be resolved into the pure racemates, for example, by chromatography and/or fractional crystallization. Racemic products can likewise be resolved into the optical antipodes, for example, by reaction with optically active acids, separation of the diastereomeric salts and liberation of the bases from the salts.

The compounds of the invention can be used, for example, for the manufacture of pharmaceutical compositions containing them in conjunction or admixture with inorganic or organic, solid or liquid pharmaceutical excipients, suitable for enteral, parenteral or topical administration. Suitable excipients are substances that do not react with the compounds of the invention, for example, water, gelatine, sugars, e.g., lactose, glucose or sucrose, starches, e.g., corn starch or arrowroot, stearic acid or salts thereof, e.g., magnesium or calcium stearate, talc, vegetable fats or oils, gums, alginic acid, benzyl alcohols, glycols and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions, which are prepared by conventional methods, are also intended to be included within the scope of the present invention.

The following examples illustrate the invention, temperatures are given in centigrade, and all parts wherever given are parts by weight.

EXAMPLE 1

The solution of 12.0 g. 3-cyanomethyl-7,8-dimethoxy-1-phenyl-1,2,4,5-tetrahydro-3-benzazepine in 50 ml. tetrahydrofuran is added to the stirred mixture of 2.7 g. lithium aluminum hydride and 150 ml. tetrahydrofuran and the whole is refluxed for 2 days. To the cold mixture 2.7 ml. water, 2.03 ml. 20% aqueous sodium hydroxide and 9.5 ml. water are added in this order. After filtration the filtrate is evaporated in vacuo, the residue triturated with diethyl ether and the mixture acidified with a solution of hydrogen chloride in dry diethyl ether. The precipitate formed is filtered off and dried in a vacuum desiccator to yield the very hygroscopic 3-(2-amino-ethyl)-7,8-dimethoxy-1-phenyl-1,2,4,5-tetrahydro - 3 - benzazepine dihydrochloride of the formula

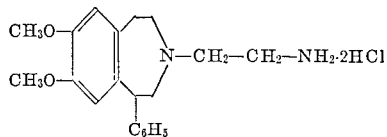

The starting material is prepared as follows: The mixture of 10.0 g. 7,8-dimethoxy-1-phenyl-1,2,4,5-tetrahydro-3-benzazepine, 125 ml. butanol, 2.66 g. chloracetonitrile, 6.0 g. sodium carbonate and 1 drop water is refluxed for 24 hours while stirring. Hereupon it is hot filtered, the filtrate evaporated and the residue recrystallized from ethanol to yield the 3-cyanomethyl-7,8-dimethoxy-1-phenyl-1,2,4,5-tetrahydro-3-benzazepine melting at 153–155°.

EXAMPLE 2

The stirred mixture of 8.0 g. 7,8-dimethoxy-1-phenyl-1,2,4,5-tetrahydro-3-benzazepine, 150 ml. benzene, 3.02 g. 2-dimethylamino-ethyl chloride and 6.0 g. sodium carbonate is refluxed for 2 days and then filtered. The filtrate is evaporated in vacuo, the residue distilled and the fraction boiling at 190–200°/0.1 mm. Hg collected; it represents the 3-(2-dimethylamino-ethyl) - 7,8 - dimethoxy - 1-phenyl-1,2,4,5-tetrahydro-3-benzazepine of the formula

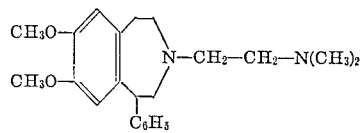

Its hydrochloride is made in isopropanol and recrystallized from isopropanol-diethyl ether; it melts at 266–267°.

EXAMPLE 3

The mixture of 2.0 g. 3-(2-amino-ethyl)-7,8-dimethoxy-1-phenyl-1,2,4,5 - tetrahydro - 3 - benzazepine, 10 ml. water, 2 ml. ethanol and 0.715 g. S-methyl-isothiourea hemisulfate is refluxed for 2 hours and allowed to stand overnight. The aqueous solution is decanted off and the residue recrystallized from ethanol-diethyl ether to yield the hygroscopic 3-(2-guanidino-ethyl)-7,8-dimethoxy-1-phenyl-1,2,4,5-tetrahydro-3-benzazepine hemisulfate of the formula

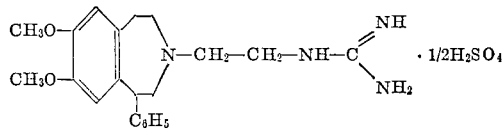

melting at 75° (bubbles).

EXAMPLE 4

To the solution of 3.1 g. hydroxylamine hydrochloride in 500 ml. ethanol 16.5 g. 3-cyanomethyl-7,8-dimethoxy-1-phenyl-1,2,4,5-tetrahydro-3-benzazepine were added and the mixture gently heated until dissolution occurs. Hereupon the solution prepared from 1.19 g. sodium and 100 ml. ethanol is added dropwise and the mixture is refluxed for 18 hours while stirring. It is filtered, the filtrate evaporated in vacuo, the residue first recrystallized from ethanol- petroleum ether and then from xylene to yield the 3 - (hydroxyguanyl-methyl)-7,8-dimethoxy-1-phenyl-1,2,4,5-tetrahydro-3-benzazepine of the formula

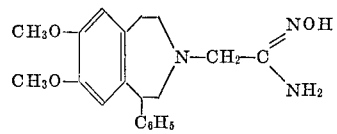

melting at 155–157°.

EXAMPLE 5

To 2.5 g. 8-chloro-1-phenyl-1,2,4,5-tetrahydro-3-benzazepine in 20 ml. benzene, 2.5 g. 50% sodium hydride in mineral oil are added and the mixture stirred at room temperature for ½ hour. Thereupon, the solution of 2.0 g. 2-chloromethyl-imidazoline in 20 ml. benzene is added and the mixture stirred for 18 hours at room temperature. Now 10 ml. water are added, the organic layer separated and acidified with ethanolic hydrochloric acid. The precipitate formed is filtered off and washed with benzene to yield the very hygroscopic 3-(2-imidazolinylmethyl)-8-chloro-1-phenyl-1,2,4,5-tetrahydro - 3 - benzazepine dihydrochloride of the formula

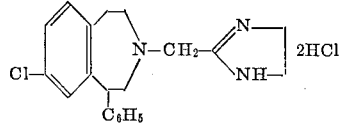

The starting material is prepared as follows: The mixture of 100 g. 2-(4-chloro-phenyl)-ethylamine and 116 g. ethyl mandelate is slowly heated up to 155° while stirring, until the theoretical amount of ethanol has been collected. The residue is recrystallized from ethanol to yield the mandelic acid 2-(4-chloro-phenyl)-ethylamide melting at 94–96°.

The mixture of 185 g. thereof and 1.0 kg. polyphosphoric acid is heated to 60–70° while stirring and the now exothermic mixture kept at this temperature for 1½ hours. It is then cooled, poured onto ice, the precipitate formed filtered off, washed with water and recrystallized from acetonitrile to yield the 8-chloro-2-oxo-1-phenyl-1,2,4,5-tetrahydro-3-benzazepine melting at 220–222°.

The solution of 30 g. thereof in 700 ml. tetrahydrofuran is slowly added to the mixture of 4.2 g. lithium aluminum hydride and 700 ml. tetrahydrofuran while stirring. The mixture is refluxed for 2 days, cooled and 4.2 ml. water, 3.0 ml. 20% aqueous sodium hydroxide and 14.7 ml. water are added in this order. It is filtered, the filtrate evaporated in vacuo, the residue distilled and the fraction boiling at 175–185°/0.05 mm. Hg collected; it represents the 8-chloro-1-phenyl,1,2,4,5-tetrahydro-3-benzazepine.

EXAMPLE 6

To 2.8 g. 7,8-dimethoxy-1-phenyl-1,2,4,5-tetrahydro-3-benzazepine in 20 ml. benzene, 2.5 g. 50% sodium hydride in mineral oil are added and the mixture stirred at room temperature for ½ hour. Thereupon the solution of 2.0 g. 2-chloromethyl-imidazoline in 20 ml. benzene is added and the mixture stirred for 18 hours at room temperature. Now 10 ml. water are added, the organic layer separated and acidified with ethanolic hydrochloric acid. The precipitate formed is filtered off and recrystallized from ethanol to yield the 3-(2-imidazolinylmethyl)-7,8-dimethoxy-1-phenyl-1,2,4,5-tetrahydro-3-benzazepine dihydrochloride of the formula

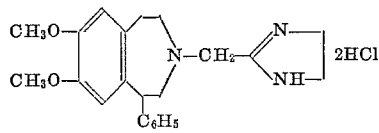

melting at 250–251°.

EXAMPLE 7

The stirred mixture of 7.9 g. 8-chloro-1-(4-chlorophenyl)-1,2,4,5-tetrahydro-3-benzazepine, 150 ml. benzene, 3,5 g. 2-pyrrolidino-ethyl chloride and 6.0 g. sodium carbonate is refluxed for 2 days and filtered hot. The filtrate is evaporated in vacuo, the residue distilled and the fraction boiling at 180–190°/0.09 mm. Hg collected; it represents the 3 - (2 - pyrrolidino-ethyl) - 8 - chloro-1-(4-chloro-phenyl)-1,2,4,5-tetrahydro - 3 - benzazepine of the formula

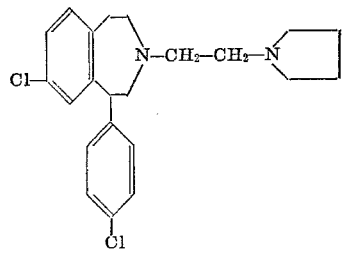

The starting material is prepared as follows: The mixture of 100 g. 2-(4-chloro-phenyl)-ethylamine and 120 g. ethyl 4-chloro-mandelate is slowly heated to about 155° until the theoretical amount of ethanol has been collected. The residue is recrystallized from aqueous ethanol to yield the 4-chloro-mandelic acid 2-(4-chloro-phenyl)-ethylamide melting at 85–87°.

The mixture of 50 g. thereof and 250 g. polyphosphoric acid is heated to 70–90° for 5 hours while stirring. The cold mixture is poured onto ice, the precipitate formed filtered off, washed with water and recrystallized from acetone to yield the 8-chloro-2-oxo-1-(4-chloro-phenyl)-1,2,4,5-tetrahydro-3-benzazepine melting at 231–233°.

The solution of 22.5 g. thereof in 700 ml. tetrahydrofuran is added slowly to the mixture of 3.1 g. lithium aluminumhydride in 700 ml. tetrahydrofuran while stirring. The mixture is refluxed for 2 days whereupon 4 ml. water, 3 ml. 20% aqueous sodium hydroxide and 14 ml. water are added in this order. The precipitate formed is filtered off, the filtrate evaporated in vacuo and the residue recrystallized from diethyl ether to yield the 8-chloro-1-(4-chloro-phenyl)-1,2,4,5 - tetrahydro - 3 - benzazepine melting at 107–110°.

What is claimed is:

1. The 3-basically substituted 1-aryl-1,2-dihydro- or 1,2,4,5-tetrahydro-3benzazepine having the formula

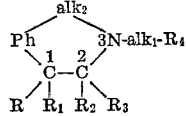

in which Ph is unsubstituted 1,2-phenylene and R unsubstituted phenyl, or one of these radicals substituted by up to 2 members selected from the group consisting of lower alkyl, lower alkoxy, lower alkylenedioxy, halogeno and trifluoromethyl, each of $R_1$, $R_2$ and $R_3$ is hydrogen or lower alkyl, $R_4$ is di-lower alkylamino, lower alkyleneimino having five to seven ring members, piperazino, N-lower alkyl-piperazino, morpholino, thiamorpholino, guanyl, lower alkylguanyl, hydroxyguanyl, N- or O-lower alkyl-hydroxyguanyl, 2-imidazolinyl or 1-lower alkyl-2-imidazolinyl, $alk_1$ is lower alkylene separating two adjacent nitrogen atoms by at least two carbon atoms and $alk_2$ is 1,2-ethylene or 1,2-ethenylene, the N-oxide, lower alkyl quaternaries or therapeutically acceptable acid addition salts thereof.

2. A compound as claimed in claim 1 and having the formula

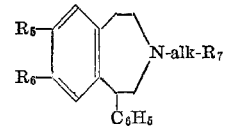

in which $R_5$ is hydrogen or methoxy, $R_6$ is hydrogen, methoxy or chloro, $alk_3$ is alkylene with up to two carbon atoms separating two adjacent nitrogen atoms by at least two carbon atoms and $R_7$ is dimethylamino, diethylamino, guanyl, hydroxyguanyl or 2-imidazolinyl, or a therapeutically acceptable acid addition salt thereof.

3. A compound as claimed in claim 1 and being the 3-(2-dimethylamino-ethyl)-7,8-dimethoxy-1-phenyl - 1,2,4,5-tetrahydro-3-benzazepine and a therapeutically acceptable acid addition salt thereof.

4. A compound as claimed in claim 1 and being the 3-(hydroxyguanyl-methyl)-7,8-dimethoxy - 1 - phenyl-1,2,4,5-tetrahydro-3-banzazepine and a therapeutically acceptable acid addition salt thereof.

5. A compound as claimed in claim 1 and being the 3-(2-imidazolinylmethyl)-8-chloro - 1 - phenyl-1,2,4,5-tetrahydro-3-benzazepine and a therapeutically acceptable acid addition salt thereof.

6. A compound as claimed in claim 1 and being the 3-(2-imidazolinylmethyl-7,8-dimethoxy - 1 - phenyl-1,2,4,5-tetrahydro-3-benzazepine and a therapeutically acceptable acid addition salt thereof.

7. A compound as claimed in claim 1 and being the 3-(2 - pyrrolidino-ethyl) - 8 - chloro-1-(4-chloro-phenyl)-1,2,4,5-tetrahydro-3-benzazepine and a therapeutically acceptable acid addition salt thereof.

References Cited
UNITED STATES PATENTS 3,093,632   6/1963   Mull _____ 260—239

ALTON D. ROLLINS, Primary Examiner

U.S. Cl. X.R.

260—243, 247.1, 247.5, 268, 288, 293, 293.4, 294.7, 294.8, 295.5, 296, 309.6, 326.13 326.5, 326.81, 329, 332.3, 332.5, 340.3, 340.5, 347.2, 347.7; 424—244, 246, 248, 250, 258, 263, 266, 267, 273, 275, 282, 285